Nov. 15, 1932.                S. E. MORRAL                1,887,776
                                 CLUTCH
                           Filed Sept. 23, 1929
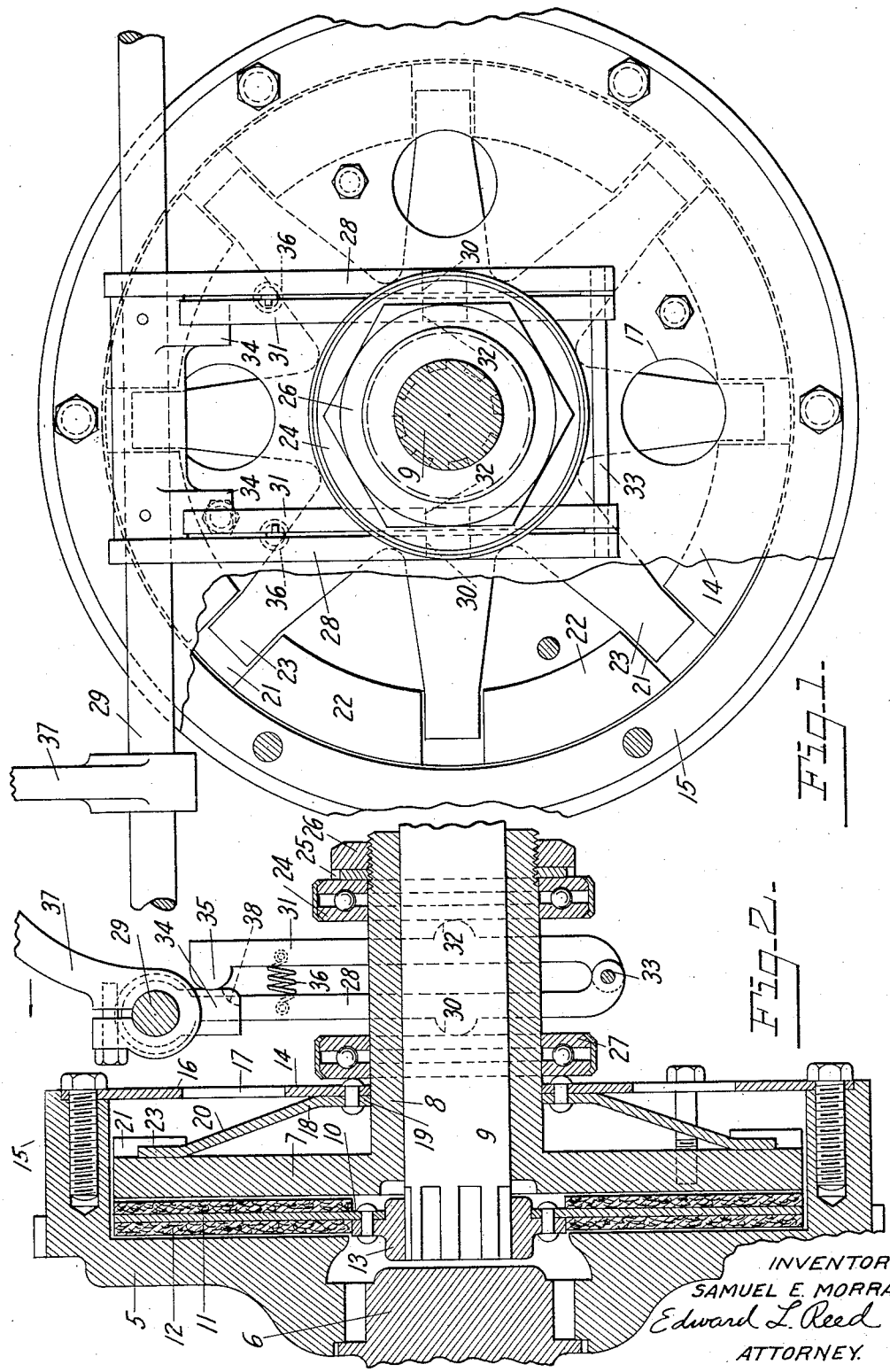
INVENTOR.
SAMUEL E. MORRAL
Edward L. Reed
ATTORNEY.

Patented Nov. 15, 1932

1,887,776

UNITED STATES PATENT OFFICE

SAMUEL E. MORRAL, OF MORRAL, OHIO

CLUTCH

Application filed September 23, 1929. Serial No. 394,469.

This invention relates to a clutch and is designed more particularly for use in connection with automobiles and the like.

One object of the invention is to provide a clutch which will be simple in its construction and efficient in operation.

A further object of the invention is to provide such a clutch having an improved type of spring for holding the clutch members normally in operative engagement.

A further object of the invention is to provide such a clutch in which the spring which holds the clutch members in operative engagement will also serve to cause two of the clutch members to rotate in unison.

A further object of the invention is to provide such a clutch with improved means for separating the clutch members to disconnect the driven shaft from the driving shaft.

Other objects of the invention will appear as the device is described in detail.

In the accompanying drawing Fig. 1 is a rear end elevation of a clutch embodying my invention, partly broken away; and Fig. 2 is a longitudinal sectional view taken centrally through such a clutch.

In this drawing I have illustrated one embodiment of my invention but it will be understood that this particular embodiment has been chosen for the purpose of illustration only and that the mechanism may take various forms and may be arranged in various ways without departing from the spirit of the invention.

In that embodiment of the invention here illustrated the clutch comprises two clutch members one of which is driven from the other and one of which is movable toward and from the other, and which, for convenience, will be designated as a front clutch member and a rear clutch member. The front clutch member, as shown at 5, is rigidly connected with a driving shaft 6. In the present instance, the front clutch member is mounted on the engine shaft and constitutes a fly wheel for the engine. The rear clutch member 7 has an elongated hub or sleeve 8, which may be formed integral therewith and which is slidably mounted on a driven shaft 9 which, in the present instance, leads to the transmission mechanism of the automobile. Arranged between the front and rear clutch members, 5 and 7, is an intermediate clutch member 10 which comprises a plate or disk 11 preferably having both sides thereof faced with friction material 12, such as a suitable asbestos composition, adapted to engage respectively the inner faces of the front and rear clutch members. In the construction here shown the contacting surfaces of the clutch members are flat. The intermediate clutch member 10 has driving connection with the driven shaft 9 and is capable of axial movement with relation to the shaft sufficient to permit it to move into and out of contact with the face of the front clutch member. As here shown, the plate 11 has a hub portion 13 which is splined on the end of the driven shaft 9 so as to cause the driven shaft to rotate therewith but to permit the hub and plate to move axially with relation to the driven shaft.

Both the front clutch member 5 and the rear clutch member 7 are positively driven from the driving shaft 6 and to this end the front clutch member has secured thereto a suitable structure 14 which is provided with means for connecting the same with the rear clutch member 7. As here shown, the front clutch member has a rearwardly extending circumferential flange 15, within which the clutch members 7 and 10 are arranged, and the supporting structure 14 is in the form of a plate or disk 16 which is rigidly secured at its outer edge to the flange 15 and has a central opening to receive the elongated hub 8 of the rear clutch member. This plate or structure constitutes a back wall which encloses the clutch members and it may, if desired, be provided with openings 17 to permit the circulation of air therethrough. Interposed between the back plate 14 and the rear clutch member 7 is a resilient member 18 which serves both to establish a driving connection between the front clutch member and the rear clutch member and to exert a yielding pressure on the rear clutch member which will move the same toward the front clutch member and hold the several clutch members normally in operative engagement. As here shown, this resilient member comprises a hub portion 19 arranged about the hub 8 and rigidly secured to the inner portion of the back wall 14. Extending outwardly from this hub are a series of resilient fingers 20 which are inclined forwardly and outwardly and have their outer ends seated in recesses 21 formed between lugs 22 carried by the rear clutch member near its periphery. Preferably the outer end portions 23 of the fingers 20 are arranged parallel with the bottoms of the recesses 21 so as to have free radial movement therein and are of such a width with relation to the recesses that they will have little or no rotary movement with relation to the rear clutch member and will thus cause that clutch member to rotate with the back wall or structure 14 of the front clutch member.

As has been stated, the resilient member 20 holds the several clutch members normally in operative engagement and in order to release the clutch the rear clutch member 7 is moved rearwardly against the action of the resilient member or spring 20, the hub 8 sliding freely in the back wall 14 and the hub 19 of the spring. In the present construction an abutment 24, here shown as a ball bearing, is mounted on the rear portion of the elongated hub 8 of the rear clutch member and is held against rearward axial movement with relation thereto by means of an adjusting nut 25 and a clamping nut 26 which are threaded onto the end of the hub and by means of which the position of the abutment on the hub may be adjusted. A second abutment 27, also shown as a ball bearing, is mounted about the hub 8 adjacent to the back wall 14. The hub is slidable through the abutment 27 and the abutment is held against forward axial movement by the back wall 14. Arranged between the abutments 24 and 27 is an arm or lever 28 which is supported at one side of the hub 8 and extends entirely across that hub between the abutments. In the present instance, the arm comprises two parts arranged on opposite sides of the hub and pivotally supported at their upper ends on a shaft 29, which may be the clutch pedal shaft. Both parts of this arm have forwardly extending projections 30 bearing against the rear face of the abutment 27. Pivotally connected with that end of the arm or lever 28 which is remote from the shaft 29 is a second arm or lever 31 also extending across the hub 8 between the abutments and comprising two parts arranged on the respective sides of the hub. Both parts of this arm have rearwardly extending projections 32 engaging the abutment 24. The ends of the adjacent parts of the arms 28 and 31 are preferably connected by a single pivot pin 33 so that they will be maintained in axial alinement. The upper or free end of the arm 31 is acted upon by a suitable actuating device which will move it away from the arm 28 and through its contact with the abutment 24 will impart rearward movement to the hub and the rear clutch member 7, thus retracting that clutch member and releasing the clutch. In the present arrangement, this actuating device comprises lugs or cam projections 34 rigidly secured to the clutch pedal shaft 29 and arranged to act upon the respective parts of the arm or lever 31, these parts being here shown as having forwardly extending rounded projections 35 to contact with the cams. A spring 36 holds the projections 35 in contact with the respective cams 34. The shaft 29 may be actuated in any suitable manner but, in the present construction, it is actuated by the usual foot pedal, a portion of which is shown at 37.

It will be apparent that when the clutch pedal 37 is moved forwardly, or depressed, the cams 34 will move the lever 31 rearwardly, thus imparting axial movement to the abutment 24, hub 8 and the rear clutch member 7 and causing the rear clutch member to be retracted against the action of the spring 20. As soon as the clutch pedal is released the spring will return the clutch member 7 to its normal operative position. If it is desired to retain the clutch in its released position after the pedal has been released this may be accomplished by providing the cam projection 34 with a recess 38 which is so arranged that when the cam has been moved into a position to release the clutch the part 35 of the lever 31 will enter the recess and the cam will then be in such a position as to hold the lever 31 against return movement until pressure has been applied to the clutch pedal in a reverse direction.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a clutch comprising a driving shaft, a driven shaft, a front clutch member rigidly secured to said driving shaft, a rear clutch member slidably mounted on said driven shaft, and means for causing said rear clutch member to be pressed toward said front clutch member, abutments mounted about the axis of said rear clutch member, one of said abutments being held against axial movement with relation to said rear clutch member and said rear clutch member having axial movement with relation to the other of said abutments, an arm supported on one side of said driven shaft, extending transversely to said driven shaft and engaging one of said abutments, a second arm pivotally connected with the first mentioned arm at that end thereof remote from its support and engaging the other of said abutments, and means to actuate said second arm to impart movement to its abutment and to said rear clutch member.

2. In a clutch comprising a driving shaft, a driven shaft, a front clutch member rigidly secured to said driving shaft, a rear clutch member slidably mounted on said driven shaft, and means for causing said rear clutch member to be pressed toward said front clutch member, an abutment connected with said rear clutch member for movement therewith, an arm supported at one side of said driven shaft and extending across the same, a second arm pivotally connected with the first mentioned arm on the other side of said driven shaft and arranged to act on said abutment, and means for actuating said second arm to cause said abutment to move said rear clutch member from said front clutch member.

3. In a clutch comprising a driving shaft, a driven shaft, a front clutch member rigidly secured to said driving shaft, a rear clutch member slidably mounted on said driven shaft, and means for causing said rear clutch member to be pressed toward said front clutch member, an abutment connected with said rear clutch member for movement therewith, an arm supported at one side of said driven shaft and extending across the same, a second arm pivotally connected with the first mentioned arm on the other side of said driven shaft and arranged to act on said abutment, a cam to engage the free end of said second arm, and means to actuate said cam.

4. In a clutch comprising a driving shaft, a driven shaft, a front clutch member rigidly secured to said driving shaft, a rear clutch member having an elongated hub slidably mounted on said driven shaft, and means for causing said rear clutch member to be pressed toward said front clutch member, an abutment mounted on said hub and held against axial movement with relation thereto, an arm supported on one side of said hub, and extending across the same, a second arm pivotally mounted on the first mentioned arm on that side of said hub opposite the support for the first mentioned arm, said second arm extending across said hub and engaging said abutment, and means acting on the free end of said second arm to cause the same to impart movement to said abutment and to said rear clutch member.

5. In a clutch comprising a driving shaft, a driven shaft, a front clutch member rigidly secured to said driving shaft, a rear clutch member having an elongated hub slidably mounted on said driven shaft, and means for causing said rear clutch member to be pressed toward said front clutch member, an abutment mounted on the rear portion of said hub and held against axial movement in a rearward direction with relation thereto, a second abutment slidably mounted on said hub and held against forward movement with relation thereto, an arm supported on one side of said hub, extending across the same and engaging with the last mentioned abutment, a second arm pivotally mounted on the first mentioned arm on that side of said hub opposite the support for said first mentioned arm, said second arm extending across said hub and engaging the first mentioned abutment, and means acting on the free end of said second arm to impart movement to said abutment and said rear clutch member.

6. In a clutch comprising a driving shaft, a driven shaft, a front clutch member rigidly secured to said driving shaft, a rear clutch member having an elongated hub slidably mounted on said driven shaft, and means for causing said rear clutch member to be pressed toward said front clutch member, an abutment mounted on the rear portion of said hub and held against axial movement in a rearward direction with relation thereto, a second abutment slidably mounted on said hub and held against forward movement with relation thereto, a shaft extending transversely to said hub at one side thereof, an arm pivotally mounted on said shaft, extending across said hub and engaging the last mentioned abutment, a second arm pivotally connected with that end of the first mentioned arm which is remote from said shaft, said second arm extending across said hub and engaging the first mentioned abutment, a cam rigidly secured to said shaft and arranged to act on the free end of said second arm, and means for imparting rotatory movement to said shaft.

7. In a clutch comprising a driving shaft, a driven shaft, a front clutch member rigidly secured to said driving shaft, a rear clutch member having an elongated hub slidably mounted on said driven shaft, and means for causing said rear clutch member to be pressed toward said front clutch member, two ball bearings mounted on said hub, held against axial movement with relation thereto and spaced apart to form abutments, a pair of levers arranged between and extending transversely to said bearings and having contact with the respective bearings, said levers being pivotally connected one to the other on one side of said hub, and means to cause said levers to act on said abutments to impart axial movement to said hub and said rear clutch member.

8. In a clutch, a driving shaft, a driven shaft, a front clutch member secured to said driving shaft, a rear clutch member slidably mounted on said driven shaft for movement toward and from said front clutch member, an intermediate clutch member arranged between said front and rear clutch members and having driving connection with said driven shaft, a structure rigidly secured to said front clutch member and arranged in the rear of said rear clutch member, a combined pressure and driving member comprising a hub portion arranged on the inner side of and rigidly secured to said structure and having a plurality of resilient fingers extending from said hub and inclined toward the peripheral portion of said rear clutch member, said rear clutch member having recesses to receive the ends of said fingers and said fingers being slidably mounted in said recesses, and means for moving said rear clutch member against the action of said fingers.

9. In a clutch comprising a driving shaft, a driven shaft, a front clutch member rigidly secured to said driving shaft, a rear clutch member slidably mounted on said driven shaft, and means for causing said rear clutch member to be pressed toward said front clutch member, spaced abutments mounted about the axis of said rear clutch member, the outer abutment being held against axial movement with relation to said rear clutch member and said rear clutch member having axial movement with relation to the inner abutment, a pair of levers arranged between and extending transversely to said abutments and pivotally connected one to the other on one side of said axis, and means acting on said levers on the other side of said axis to cause the same to operatively engage the respective abutments and to move said rear clutch member from said front clutch member.

In testimony whereof, I affix my signature hereto.

SAMUEL E. MORRAL.